US007349423B2

United States Patent
Pantelias

(10) Patent No.: US 7,349,423 B2
(45) Date of Patent: Mar. 25, 2008

(54) SYSTEM AND METHOD FOR THE REUSE OF S-CDMA PARAMETERS TO DEFINE TDMA MINISLOT SIZE

(75) Inventor: Niki Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 844 days.

(21) Appl. No.: 10/611,977

(22) Filed: Jul. 3, 2003

(65) Prior Publication Data

US 2004/0100985 A1 May 27, 2004

Related U.S. Application Data

(60) Provisional application No. 60/428,749, filed on Nov. 25, 2002.

(51) Int. Cl.
*H04J 3/02* (2006.01)
(52) U.S. Cl. .................................................... 370/458
(58) Field of Classification Search ................ 370/252, 370/441, 431, 458
See application file for complete search history.

(56) References Cited

U.S. PATENT DOCUMENTS 7,002,899 B2* 2/2006 Azenkot et al. ............ 370/208

2004/0190544 A1* 9/2004 Azenko et al. ............. 370/442

OTHER PUBLICATIONS

"Data-Over-Cable Service Interface Specifications, Radio Frequency Interface Specification, SP-RFIv2.0-I03-021218," Cable Television Laboratories, Inc. (Dec. 18, 2002), pp. i-xxiv, and 1-482.

* cited by examiner

*Primary Examiner*—Seema S. Rao
*Assistant Examiner*—Mon Cheri S Davenport
(74) *Attorney, Agent, or Firm*—Sterne, Kessler, Goldstein & Fox P.L.L.C.

(57) ABSTRACT

A system and method is presented for reuseing its S-CDMA related hardware (e.g., timestamp, minislot and frame count hardware) to create an extended mode to DOCSIS 2.0, namely to allow the TDMA channel to have any minislot size as is afforded to the S-CDMA channel. This reuse of existing S-CDMA hardware to create the extended mode is accomplished without the burden (e.g., complexity, cost, and schedule) of additional hardware to perform a separate set of calculations. In order to accomplish the foregoing, parameters are determined to use in a S-CDMA-type UCD message such that when that UCD message is interpreted by both the cable modem and CMTS hardware as though it were an S-CDMA message, the result is an TDMA minislot size that represents a desired integer number of ticks per minislot. In addition, the system and method periodically constructs the relationship between the system timestamp count, a channel's minislot count and the frame count via a timestamp snapshot.

14 Claims, 9 Drawing Sheets

SYSTEM AND METHOD FOR THE REUSE OF S-CDMA PARAMETERS TO DEFINE TDMA MINISLOT SIZE

BACKGROUND OF THE INVENTION

1. Field of the Invention

The present invention is related to broadband communication systems that use Data Over Cable Service Interface Specification (DOCSIS) media access protocol or any of its derivatives. Particularly, the present invention applies to the reuse of Synchronous Code Division Multiple Access (S-CDMA) related hardware (e.g., timestamp, minislot and frame count hardware) to create an extended mode to DOCSIS 2.0, namely to allow the Time Division Multiple Access (TDMA) channel to have any minislot size as is afforded to the S-CDMA channel.

2. Related Art

Cable modems provide communications on cable networks. In general, a user connects a cable modem to the TV outlet for his or her cable TV, and the cable TV operator connects a cable modem termination system ("CMTS") in the operator's headend. The CMTS is a central device for connecting the cable network to a data network like the Internet. The CMTS is a central distribution point for a cable system. Data flows "downstream" from the CMTS to the cable modem (i.e., downstream channel). Alternatively, data flows "upstream" from the cable modem to the CMTS (i.e., upstream channel).

A common cable modem standard today is the Data Over Cable Service Interface Specification ("DOCSIS"). DOCSIS defines technical specifications for both cable modems and CMTS.

DOCSIS 2.0 introduces a multiple-access scheme via the concept of multiple logical channels per physical channel. The primary motivation for this is to allow modems of different types to coexist on the same physical spectrum, including TDMA (Time Division Multiple Access) and S-CDMA (Synchronous Code Division Multiple Access). S-CDMA and TDMA require different sets of channel parameters and their physical layer transmissions are not compatible. Therefore, the multiple logical channel approach is necessary to allow these modems to share the same physical spectrum on the cable plant.

To coordinate upstream data transmission on multiple logical channels from multiple modems to the CMTS, the modems send request messages to the CMTS. These request messages indicate to the CMTS the amount of bandwidth needed to transmit the data. The bandwidth expressed in minislots is sometimes referred to as the physical length of the data to be transmitted. The physical length required to transmit a data packet having a given byte length varies depending upon the overhead imposed by the physical layer (e.g., TDMA or S-CDMA) of the cable system. The parameters that determine the overhead may include, but are not limited to, the preamble, guard band, forward error correction, and padding.

In DOCSIS 2.0, an upstream channel is defined by a UCD (upstream channel descriptor), which is a type of message broadcast from the CMTS to all modems. UCD parameters may include, but are not limited to, center frequency, symbol rate, physical layer type (e.g., S-CDMA or TDMA), burst-specification items such as modulation order and forward error correction (FEC) codeword size, etc. When a request to transmit data is made by a modem, the byte length of the data packet to be transmitted is converted to the physical length by calculations based on a formula that includes the UCD parameters.

Upstream bandwidth is divided into minislots, which are the smallest time unit utilized for bandwidth requests and grants. When a grant message is returned to the requesting modem, it tells the requesting modem which minislots to use for upstream transmission of the data packet. Because the minislot is the unit in which upstream capacity is allocated to modems, one parameter the modem needs to operate on a channel is the size of the minislot. Minislot size differs between TDMA and S-CDMA channels, which is explained next.

On TDMA channels, minislot size is limited to power-of-two sizes and is given explicitly in a dedicated field in the UCD message. Here, the minislot size field is characterized by its size T, defined in units of timebase ticks of 6.25 µs. Allowable values for T are $T=2^M$ when M is one of 1 through 7. That makes T=2, 4, 8, 16, 32, 64 or 128. Thus, 1 tick equals 6.25 µs which equals 64 counts of the timestamp reference clock. The modem uses this value from the UCD in conjunction with the symbol rate to determine how many symbols are in one minislot.

TDMA assigns different time slots to different modems (or users). During the time slot assigned to one modem, all other modems remain silent and therefore there is no interference between the modems.

One reason to limit minislot size to power-of-two sizes means that the system timestamp count and the minislot count for a particular channel always have a fixed relationship. Here the minislot count is derived by a binary shift-right by a given number of bits of the system timestamp count.

S-CDMA differs from TDMA in that minislot size is not limited to power-of-two sizes. With S-CDMA, the incoming data is organized in minislots which have two dimensions including spreading codes and time. The time duration of minislots is one S-CDMA frame that spans a programmable number of S-CDMA symbol intervals. Generally, the maximum frame length is 32 S-CDMA symbol intervals. Symbol spreading is performed through multiplication by a spreading code (spreading sequence) of 128 chips taken from a set of 128 orthogonal codes that are generated by a quasi-cyclic shift.

In DOCSIS 2.0, an S-CDMA spreading interval is equal to 128 TDMA symbol intervals. Two ways to control minislot size with S-CDMA are to control the size of the frame and/or to control the number of codes in a minislot.

Since minislot size in S-CDMA is not limited to power-of-two sizes, this means that the system timestamp count and the minislot count for a particular channel do not have a fixed relationship. S-CDMA uses a timestamp snapshot constructed to periodically indicate the relationship between these two quantities and also between them and the frame counter.

When minislot size can be more finely controlled to accommodate data packets, the result is a more efficient use of bandwidth. For example, with TDMA the minislot size is limited to one of 2, 4, 8, 16, 32, 64 or 128 ticks. Assuming that a 17 tick per minislot is needed to hold a data packet, in TDMA a 32 tick minislot would be used. This wastes 15 ticks of bandwidth. Therefore, what is needed is a way of allowing the TDMA channel to have the same flexibility with minislot size as is afforded to the S-CDMA channel without the burden (e.g., complexity, cost, and schedule) of additional hardware to perform a separate set of calculations.

SUMMARY OF THE INVENTION

The present invention is a system and method for reusing its S-CDMA related hardware (e.g., timestamp, minislot and frame count hardware) and messaging to create an extended mode to DOCSIS 2.0, namely to allow the TDMA channel to have any minislot size as is afforded to the S-CDMA channel. This reuse of existing S-CDMA hardware to create the extended mode is accomplished without the burden (e.g., complexity, cost, and schedule) of additional hardware to perform a separate set of calculations. In order to accomplish the foregoing, the present invention chooses parameters to put into a S-CDMA-type UCD message such that when that UCD message is interpreted by both the cable modem and CMTS hardware as though it were an S-CDMA message, the result is a TDMA minislot size that represents a desired integer number of ticks per minislot. The invention also periodically constructs the relationship between the system timestamp count, a channel's minislot count and the frame count via a timestamp snapshot.

The method of the present invention includes the steps of determining S-CDMA parameters to create a S-CDMA-type UCD message by a CMTS; forwarding the S-CDMA-type UCD message to a modem operating in TDMA mode by the CMTS; calculating a TDMA minislot size by the modem using the S-CDMA parameters; calculating a frame duration value and a minislots per frame value; using the frame duration value and the minislots per frame value to maintain a minislot counter and a frame counter; and constructing a relationship between a system timestamp counter, the minislot counter and the frame counter via a timestamp snapshot.

BRIEF DESCRIPTION OF THE FIGURES

The present invention will be described with reference to the accompanying drawings, wherein.

DETAILED DESCRIPTION OF THE PREFERRED EMBODIMENTS

A. Overview of the Invention

The present invention reuses its S-CDMA related hardware (e.g., timestamp, minislot and frame count hardware) to create an extended mode to DOCSIS 2.0, namely to allow the TDMA channel to have any minislot size as is afforded to the S-CDMA channel. This reuse of existing S-CDMA hardware to create the extended mode is accomplished without the burden (e.g., complexity, cost, and schedule) of additional hardware to perform a separate set of calculations. In order to accomplish the foregoing, the present invention chooses parameters to put into a S-CDMA-type UCD message such that when that UCD message is interpreted by both the cable modem and CMTS hardware as though it were an S-CDMA message, the result is an TDMA minislot size that represents a desired integer number of ticks per minislot. The invention also periodically constructs the relationship between the system timestamp count, a channel's minislot count and the frame count via a timestamp snapshot.

For illustration purposes, the present invention is described in terms of being utilized with a cable network and DOCSIS 2.0. It should also be understood that the present invention is not limited to use with a cable network and/or DOCSIS 2.0. In fact, the present invention may be used with any communication medium, including but not limited to, the Internet, intranets, fiber optic networks, wireless networks and satellite-based networks.

B. System Architecture Overview

Figure 1:
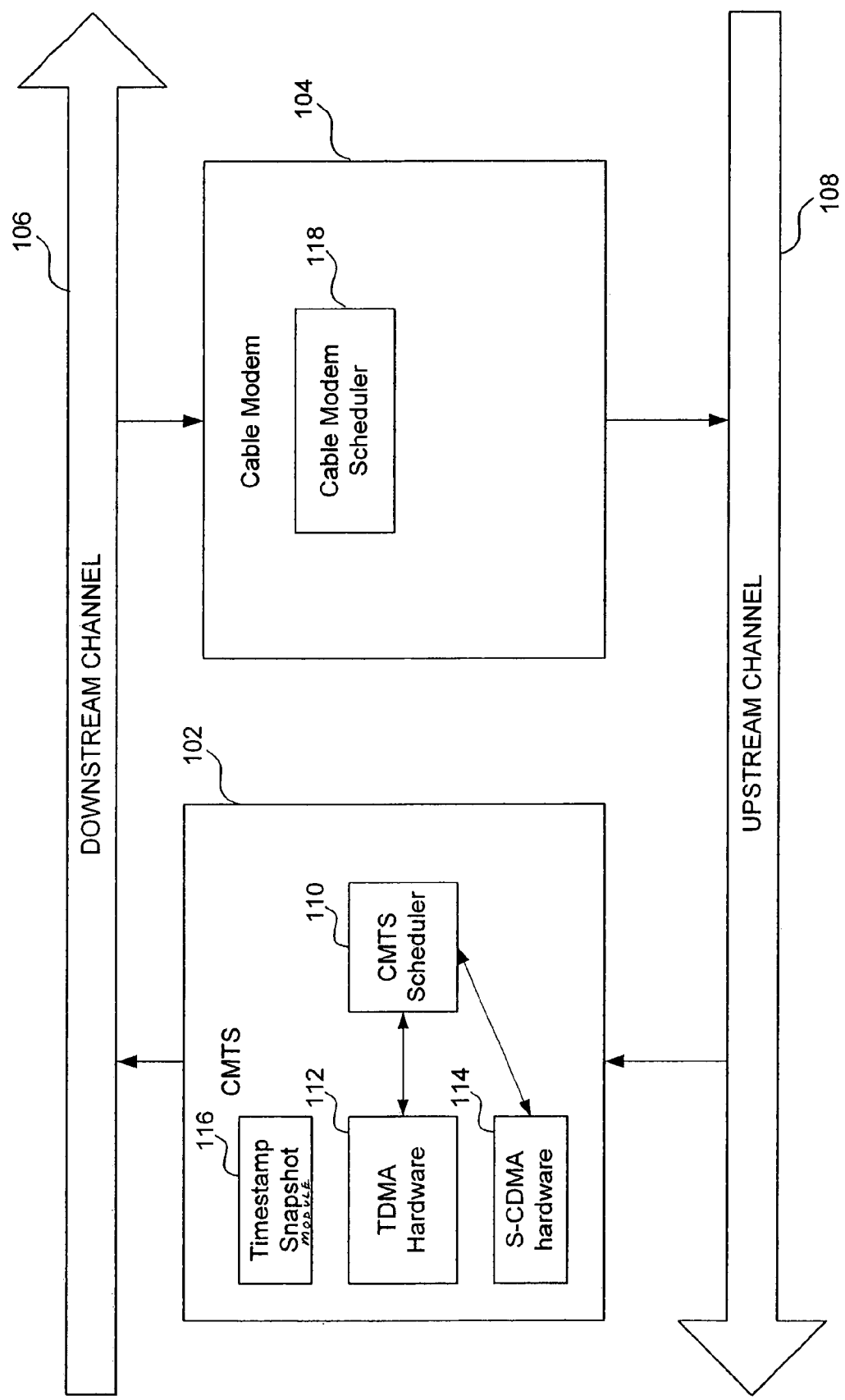
FIG. 1 is a block diagram representing an example operating environment of the present invention according to an embodiment.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, the system includes a CMTS 102, one or more of cable modem 104, downstream channel 106 and upstream channel 108, are shown. CMTS 102 further includes a CMTS scheduler 110, TDMA hardware 112, S-CDMA hardware 114 and a timestamp snapshot module 116. Cable modem 104 includes a cable modem scheduler 118. Each of these components will be briefly described next.

In general, cable modem 104 forwards or provides data via upstream communications on cable networks on either a TDMA or a S-CDMA logical channel. Cable modem 104 receives data from a user that needs to be transferred via a cable network. In order to do this, cable modem 104 requests that CMTS 102 grant to it the necessary bandwidth.

As mentioned, cable modem 104 receives data from a user to be transferred via a cable network. In addition, CMTS 102 receives data from the network to be transferred to cable modem 104. CMTS 102 generates an Upstream Channel Descriptor (UCD) message type that is specific to the applicable TDMA or S-CDMA logical channel that also is transferred to cable modem 104.

Cable modem scheduler 118 is coupled to cable modem 104. In general, cable modem scheduler 1.18 is responsible for multiplexing the internal traffic, (i.e., requesting the necessary bandwidth that cable modem 104 needs to transfer its current types of data). Cable modem scheduler 118 sends bandwidth requests to CMTS 102 via upstream channel 108. CMTS 102, CMTS scheduler 110, TDMA hardware 112, S-CDMA hardware 114 and timestamp snapshot module 116 will now be described.

CMTS 102 is a central device for connecting the cable network to a data network. CMTS scheduler 110 is a bandwidth manager and must take into consideration that there is more than one type of logical channel using the same physical spectrum. CMTS scheduler 110, as a bandwidth manager, decides how to grant available bandwidth for the different logical channels in time according to the current bandwidth requests so that each logical channel type gets to use the physical spectrum.

In order to allow more than one cable modem 104 to share upstream channel 108, CMTS 102 sends bandwidth grant allocation (MAP) messages to the one or more cable modems 104 for each logical upstream channel in the MAP domain of the downstream. In the DOCSIS 2.0 protocol, these messages are referred to as MAP messages. The MAP messages identify burst types, give start times, and durations for each cable modem that is granted bandwidth on a given upstream logical channel type.

An upstream channel descriptor (UCD) message must be transmitted by CMTS 102 at a periodic interval to define the characteristics of upstream channel 108. A separate message must be transmitted for each active upstream logical channel.

TDMA hardware 112 is specific to the TDMA channel type and includes, but is not limited to, minislot hardware. Likewise, S-CDMA hardware 114 is specific to the S-CDMA channel type and includes, but is not limited to, system timestamp, minislot and frame counter hardware.

Figure 2:
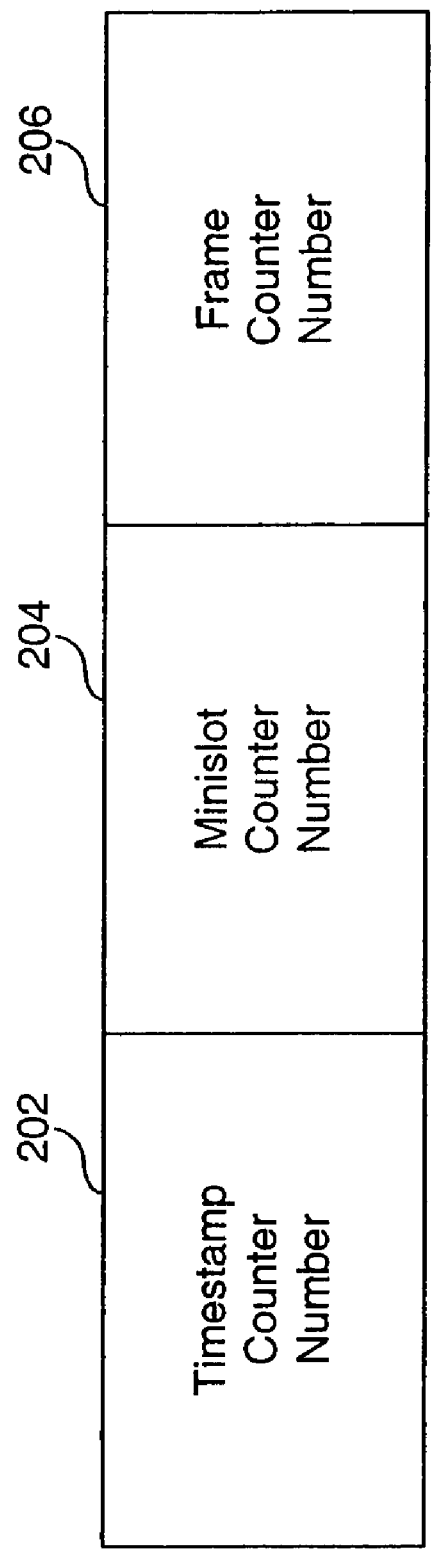
FIG. 2 illustrates the timestamp snapshot of the invention according to an embodiment.

Timestamp snapshot module 116 allows the present invention to periodically construct the relationship between the system timestamp, a channel's minislot count and the frame count via S-CDMA hardware 114, as will be described in more detail below. As shown in FIG. 2, timestamp snapshot 200 is constructed by timestamp snapshot module 116 and is comprised of a timestamp counter number 202, a minislot counter number 204 and a frame counter number 206. An overview of S-CDMA minislot organization is next described with reference to FIG. 3 in order to facilitate the understanding of the present invention.

C. S-CDMA Minislot Organization

Figure 3:
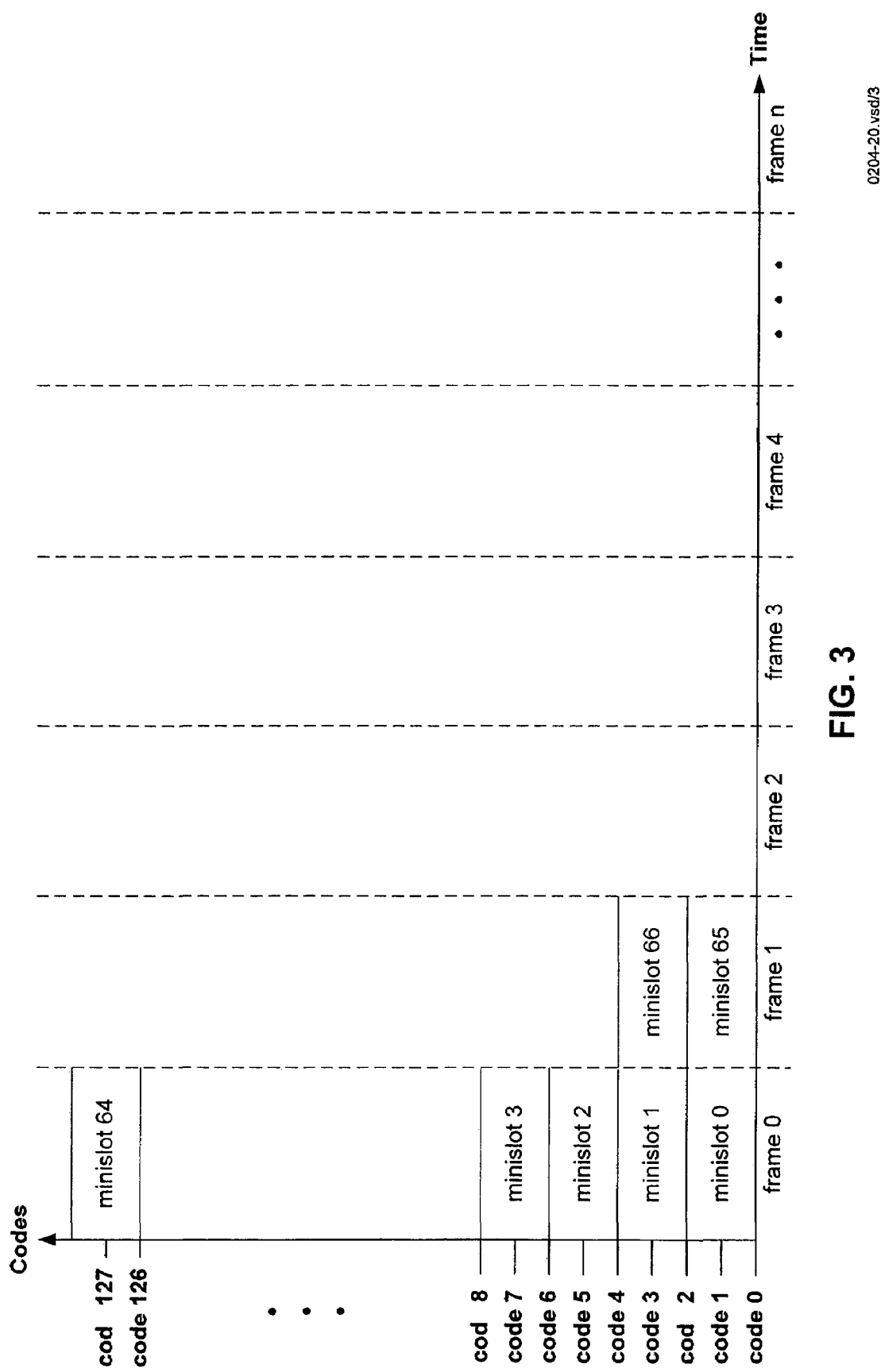
FIG. 3 is a diagram illustrating one example of how minislots may be defined/organized in a S-CDMA channel according to an embodiment of the present invention.

FIG. 3 is a diagram illustrating one example of how minislots may be defined/organized in a S-CDMA channel. As mentioned above, two ways to control minislot size with S-CDMA is to control the size of the frame and/or to control the number of codes in a minislot. FIG. 3 is not meant to limit the invention.

In FIG. 3, the x axis illustrates time divided into frame 0 through frame n. The y axis is divided into 128 codes. Not shown in the diagram is the z axis that divides frequency into different logical channels (e.g., either TDMA or S-CDMA). When the cable system is spreader off, then the modem that is currently being provided with minislot(s) is a TDMA-type of modem. When the cable system is spreader on, then the modem that is currently being provided with minislot(s) is a S-CDMA-type of modem.

In S-CDMA, a minislot contains a programmable number of spreading codes, which can be as low as 2 and as high as 128. A minislot contains symbols from a single cable modem 104. Symbols are numbered first vertically across codes and then horizontally across spreading intervals in a frame.

The example in FIG. 3 illustrates that each minislot includes two codes. For example, minislot 0 is in frame 0 and has codes 0 and 1, minislot 1 is also in frame 0 and has codes 2 and 3, and so forth. CMTS 102 may assign one or more minislots to a single modem during the same frame. In the example where each minislot is assigned to a different modem, there is code-division multiple access between 64 modems signals during that frame. The spreading code orthogonality ensures that there is no interference between symbols transmitted in parallel by the same modem, since these symbols are perfectly time synchronized.

As described above, the present invention chooses parameters to put into a S-CDMA-type UCD message such that when that UCD message is interpreted by both the cable modem and CMTS hardware as though it were an S-CDMA message, the result is an TDMA minislot size that represents a desired integer number of ticks per minislot. The applicable parameters are: (1) modulation rate, (2) spreading intervals per frame (K), (3) number of active codes, and (4) codes per minislot (Cms). Each of these parameters are briefly introduced next.

D. S-CDMA-Type UCD Message Parameters Used to Define TDMA Minislot Size

1. Modulation Rate

Modulation rate entirely determines the duration of a spreading interval. A spreading interval is the time over which a symbol is spread (128 * signaling period). The present invention assumes that the modulation rate of the channel is provided. Thus, the invention may use a lookup table that contains similar entries as shown in Table 1. Here, since the modulation rate is provided, the invention could use the lookup table to derive the value of the modulation rate parameter to use in the S-CDMA-type UCD message, the spreading interval duration value and the ticks per spreading interval value.

TABLE 1

| Modulation rate | Value of Modulation rate Parameter in UCD | Spreading interval duration | Ticks per spreading interval |
|---|---|---|---|
| 160 ksym | 1 | 800 usec | 128 |
| 320 ksym | 2 | 400 usec | 64 |
| 640 ksym | 4 | 200 usec | 32 |
| 1.28 Msym | 8 | 100 usec | 16 |
| 2.56 Msym | 16 | 50 usec | 8 |
| 5.12 Msym | 32 | 25 usec | 4 |

2. Spreading Intervals per Frame (K)

The size of a frame is expressed in spreading intervals. A frame is defined to span K spreading intervals and up to 128 codes. A spreading interval equals the time it takes to send one symbol on all 128 codes. Thus, a spreading interval is equal to one symbol per code. For example, if there are 17 spreading intervals per frame, then there are 17 symbols on each code. If there are 34 symbols per minislot, then taking a 17 spreading interval frame and using 2 codes per minislot would result in 34 symbols per minislot.

3. Number of Active Codes

Number of active codes in the present invention is always assumed to be 128. The maximum number of active codes is 128 and this value indicates that all available channel bandwidth is in use. A value smaller than 128 may be used to reduce the channel bandwidth usage proportionately. This would be used to allow increased power per code which improves robustness on noisy channels.

However, on an TDMA channel, there is no physical concept corresponding to reducing the number of active codes (options such as modulation rate or FEC changes could be used to give an equivalent robustness improvement). Thus, the value 128 must always be used for number of active codes when constructing a UCD message for an TDMA channel.

4. Codes Per Minislot (Cms)

A minislot contains a programmable number of Cms, which can be as low as 2 and as high as 128.

How the present invention uses these four parameters, along with existing S-CDMA hardware 114, to create an extended mode to DOCSIS 2.0 to allow the TDMA logical channel to have any minislot size as is afforded to the S-CDMA logical channel is described next with references to FIGS. 4-8.

E. Operation of the Present Invention

Figure 4:
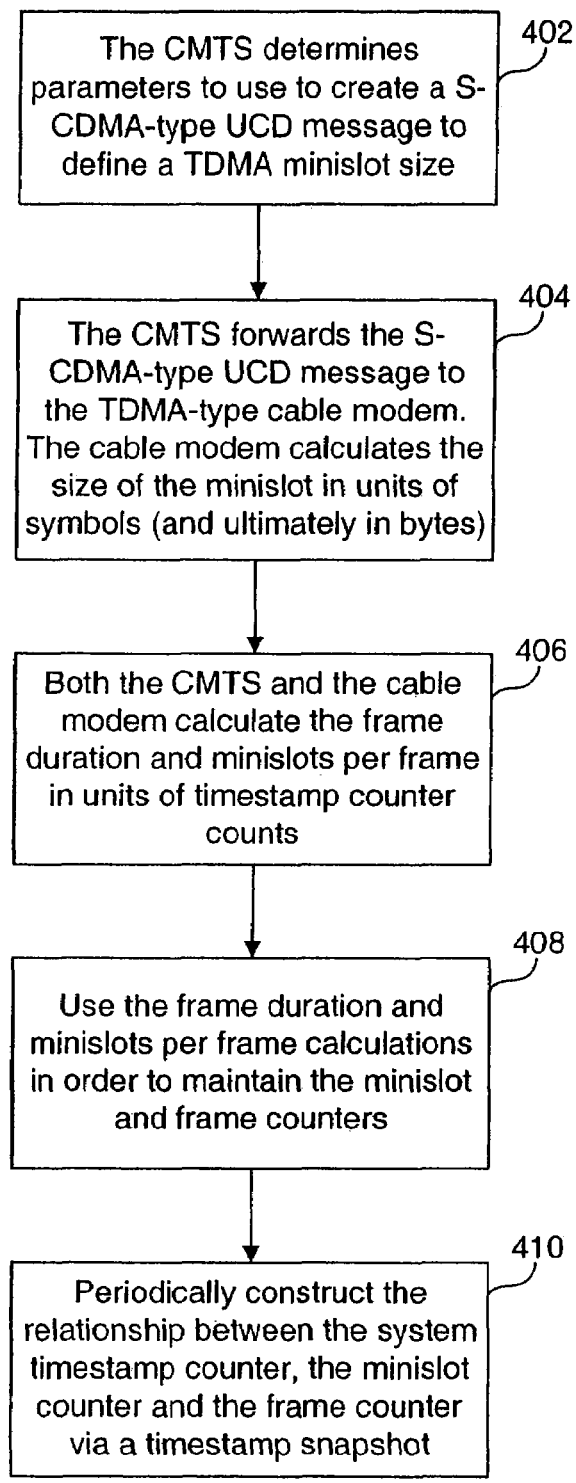
FIG. 4 is a flowchart illustrating a high level operation of the present invention according to an embodiment.

The flowchart in FIG. 4 illustrates the high level operation of the present invention. The flowchart in FIG. 4 begins at step 402. In step 402, CMTS 102 determines the values of the parameters used to create a S-CDMA-type UCD message to define a TDMA minislot size. As just described above, these four parameters include: (1) modulation rate, (2) spreading intervals per frame (K), (3) number of active codes, and (4) codes per minislot (Cms). How the present invention determines the parameter values is described below with reference to FIG. 5.

Once these parameter values are determined, CMTS 102 then uses these parameter values to create a S-CDMA-type UCD message that defines the TDMA minislot size. Control then passes to step 404.

In step 404, CMTS 102 forwards the S-CDMA-type UCD message to the TDMA-type cable modem 104. Cable modem 104 then uses the forwarded S-CDMA-type UCD message to calculate the minislot size in units of symbols and ultimately bytes, which is described below in more detail with reference to FIG. 6. Control then passes to step 406. In step 406, both CMTS 102 and cable modem 104 calculate the frame duration and minislots per frame in units of timestamp counter counts. The present invention considers all minislots within a given frame to start at the same time, even if that frame is spreader-off or TDMA. Thus, when multiple logical channels are in use and the CMTS MAP parser must interleave the maps from the various channels, the S-CDMA requirement that a logical channel's "active" region begin and end on a frame boundary also applies to TDMA, even though the "frame" has no physical significance in TDMA.

When multiple logical channels are being interleaved, a "frame" structure must be considered to exist on the TDMA channel exactly as it exists on the S-CDMA channel. If the TDMA channel has any active grants during this artificial "frame", no other logical channel may grant to anything other than SID 0 during the time of that frame (also exactly like S-CDMA). Thus, it is entirely up to CMTS 102 to keep track of these artificial frames and make sure logical channels are interleaved correctly (exactly as though the TDMA channel was a S-CDMA channel). The calculations related to frame duration and minislots per frame in units of timestamp counter counts are described in more detail with reference to FIG. 7. Control then passes to step 408.

In step 408, both CMTS 102 and cable modem 104 use the calculated frame duration and minislots per frame values to maintain the minislot and frame counters of S-CDMA hardware 114 (FIG. 1). This step is further described in more detail below with reference to FIG. 8. Control then passes to step 410.

In step 410, both CMTS 102 and cable modem 104 periodically construct the relationship between the system timestamp counter, the minislot counter and the frame counter via timestamp snapshot 200 (FIG. 2). This is done by reading the current values of the system timestamp counter, the minislot counter and the frame counter of S-CDMA hardware 114 and storing the values as timestamp snapshot 200. Thus, timestamp snapshot module 116 in CMTS 102 constructs timestamp snapshot 200 and forwards a copy of timestamp snapshot 200 to cable modem 104. The flowchart in FIG. 4 ends at this point.

As will be described below with reference to FIG. 8, each time a frame duration number of timestamp counts passes, the minislot counter of S-CDMA hardware 114 is incremented by the number of minislots per frame. In addition, each time a frame duration number of timestamp counts passes, the frame counter of S-CDMA hardware 114 is incremented by one. Thus, every time the system timestamp counter rolls over, the present invention takes a snapshot of the current values of the minislot counter by storing its value in minislot counter number 204 (FIG. 2) and the frame counter by storing its value in frame counter number 206 (FIG. 2). This is how a new cable modem joining an existing cable system can get synced with the cable system. How CMTS 102 determines the parameter values and creates a S-CDMA-type UCD message (step 402 from FIG. 4) are described next with reference to FIG. 5.

Figure 5:
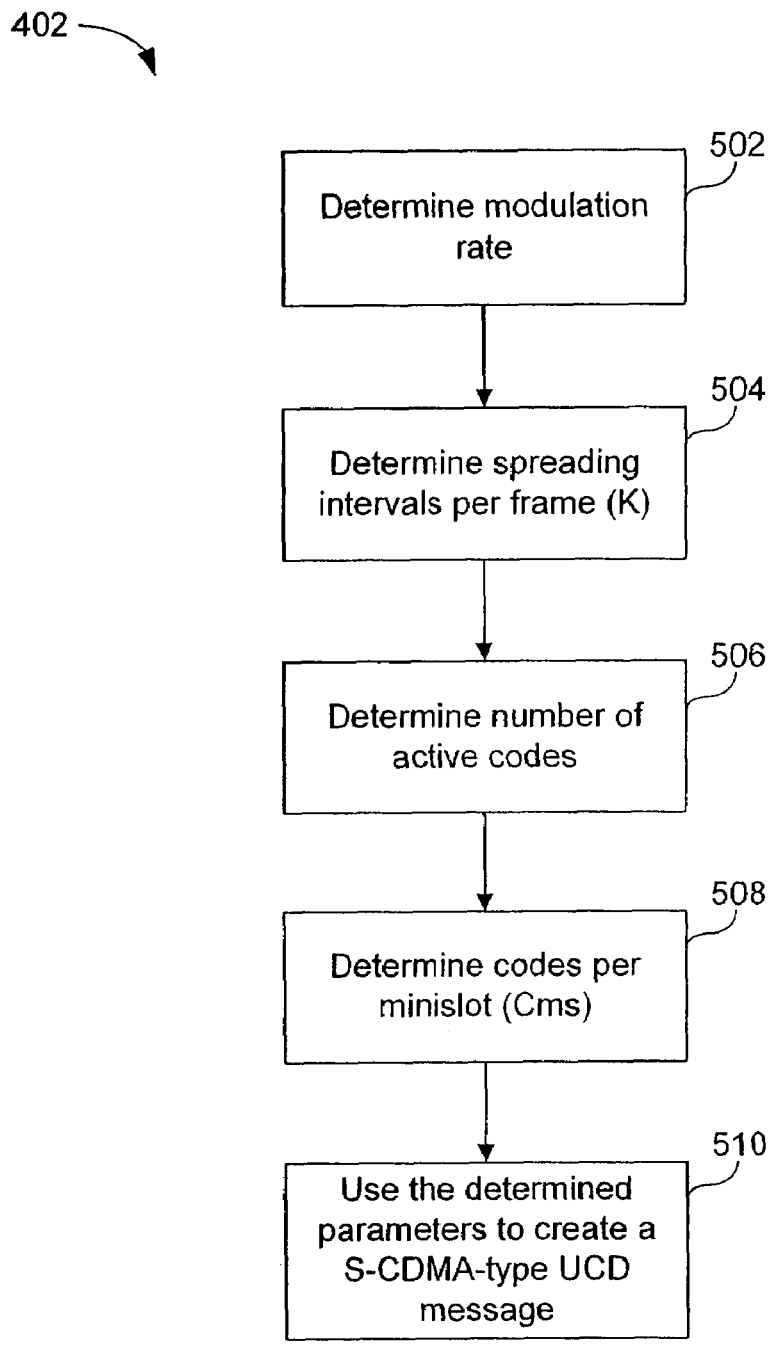
FIG. 5 is a flowchart illustrating how the CMTS determines the parameter values and creates a S-CDMA-type UCD message according to an embodiment of the present invention.

In FIG. 5, the flowchart begins at step 502. In step 502, CMTS 102 determines the value of the modulation rate parameter. As described above, the present invention assumes that the modulation rate of the channel is given. Example modulation rates are provided in Table 1 above. CMTS 102 determines the value for the modulation rate parameter for the S-CDMA-type UCD message from Table 1. For example, in Table 1, if the modulation rate is 5.12 Msym, then the value of the modulation rate parameter is 32. Control then passes to step 504.

In step 504, CMTS 102 determines the value for the spreading intervals per frame (K) parameter. It is optimal to minimize the duration of the artificial "frame" (i.e., minimize the value of K) so as to allow maximum flexibility when interleaving multiple logical channels on a single physical channel. To minimize K, CMTS 102 first calculates the following intermediate value:

Minislots per Spreading Interval=Ticks per Spreading Interval/Desired Ticks per Minislot.

Ticks per spreading interval is found in Table 1 and is depended on the value of the modulation rate parameter. In Table 1, for example, assume the modulation rate parameter is 32, then the ticks per spreading interval is 4. Also assume that at 5.12 Msym, the desired ticks per minislot is 17. Thus, we have the following calculation from above:

Minislots per Spreading Interval=4/17.

Next, if the result of the above (minislots per spreading interval) is an integer, then CMTS 102 sets K equal to 1; otherwise CMTS 102 sets K equal to the smallest possible value that can be multiplied by the result to get an integer. Therefore, in this example CMTS 102 would set K equal to 17, since 17*(4/17)=4. Control then passes to step 506 in FIG. 5.

In step 506, CMTS 102 determines the value for the number of active codes parameter. As stated above, the present invention always assumes this parameter is equal to 128. Control then passes to step 508.

In step 508, CMTS 102 determines the value for the codes per minislot (Cms) parameter. To determine Cms, CMTS 102 first calculates the following:

Minislots per Frame=Minislots per Spreading Interval*K.

Thus,

Minislots per Frame=(4/17)*17=4.

Next, CMTS 102 calculates:

Cms=Number of Active Codes/Minislots per Frame.

Thus,

Cms=128/4=32.

From the above example, at 5.12 Msym, value of the modulation rate parameter is 32 (step 502), K=17 (step 504), number of active codes=128 (step 506), and Cms=32 (step 508). This gives 17 ticks per minislot with the smallest possible value of K. This example was provided for illustration purposes only and is not meant to limit the invention. Control then passes to step 510.

In step 510, CMTS 102 uses the values for the four parameters calculated in steps 502-508 and creates a S-CDMA type UCD message. The flowchart in FIG. 5 ends at this point. How cable modem 104 then uses the forwarded S-CDMA-type UCD message to calculate the minislot size in units of symbols and ultimately bytes (step 404 from FIG. 4) is described below in more detail with reference to FIG. 6.

Figure 6:
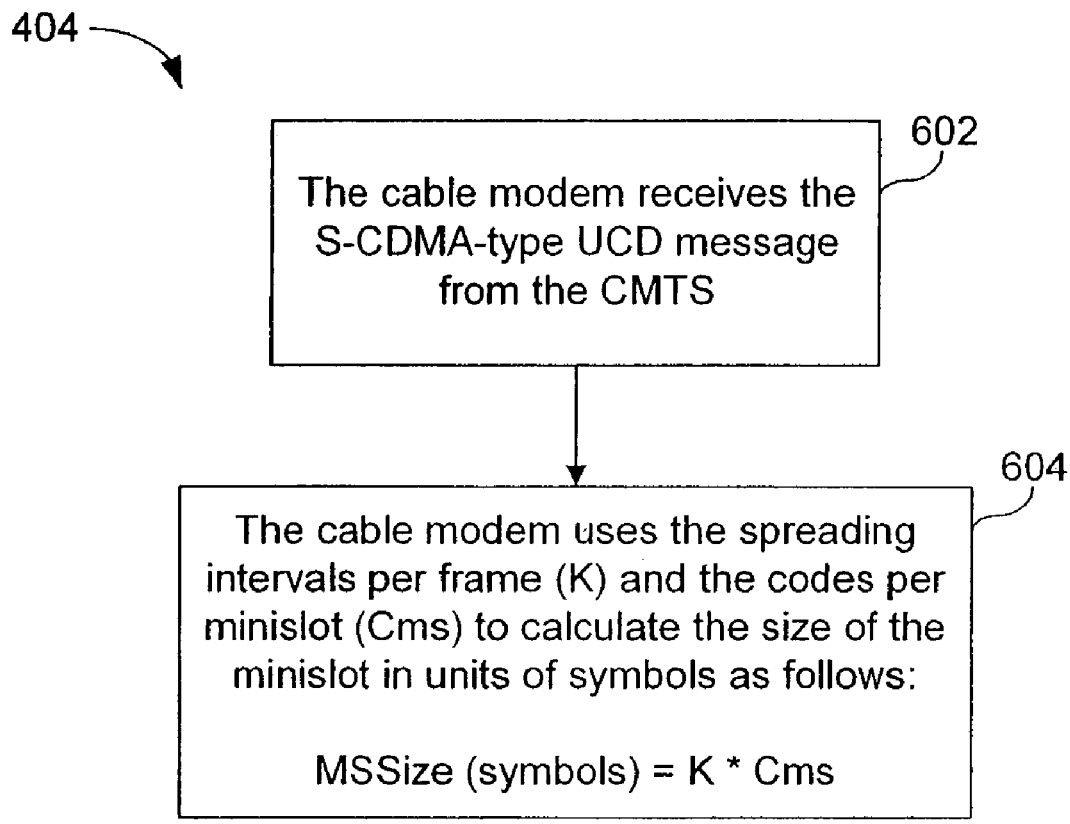
FIG. 6 is a flowchart illustrating how a TDMA cable modem uses the forwarded S-CDMA-type UCD message to calculate the minislot size in units of symbols and ultimately bytes according to an embodiment of the present invention.

The flowchart in FIG. 6 starts at step 602. In step 602, cable modem 104 receives the S-CDMA-type UCD message from CMTS 102. Control then passes to step 604.

In step 604, cable modem uses the value for the spreading intervals per frame (K) parameter and the value for the codes per minislot (Cms) parameter to calculate the size of the minislot in units of symbols, as follows:

MSSize(symbols)=K*Cms.

Thus, continuing with the above example at 5.12 Msym,

MSSize (symbols)=17*32=544.

The flowchart in FIG. 6 ends at this point. How CMTS 102 and cable modem 104 calculate the frame duration and minislots per frame in units of timestamp counter counts (step 406 in FIG. 4) is described next with reference to FIG. 7.

Figure 7:
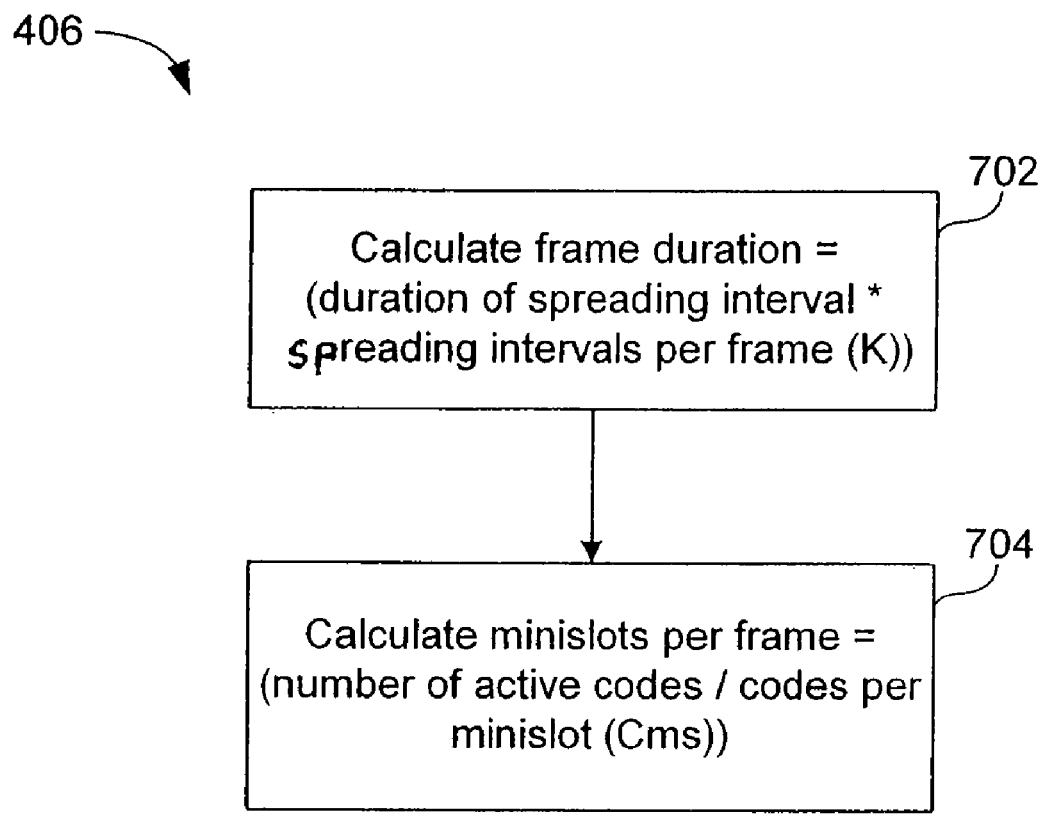
FIG. 7 is a flowchart illustrating how calculations related to frame duration and minislots per frame in units of timestamp counter counts are performed according to an embodiment of the present invention.

The flowchart in FIG. 7 starts at step 702. In step 702, both CMTS 102 and cable modem 104 perform the following calculation:

Frame Duration=(Spreading Interval Duration*Spreading Intervals per Frame (K)).

Following with the above example at 5.12 Msym, the spreading interval duration value can be found in Table 1. In Table 1, at 5.12 Msym, the spreading interval duration equals 25 usec. K was determine above to be 17. Thus, Frame Duration=25 usec*17=425 usec.

Control in FIG. 7 then passes to step 704.

In step 704, both CMTS 102 and cable modem 102 perform the following calculation:

Minislots Per Frame=(Number of Active Codes/ Codes per Minislot (Cms)).

From the above example,

Minislots per Frame=128/32=4.

Note that the present invention may require this result to be an integer value. The flowchart in FIG. 7 ends at this point. How CMTS 102 and cable modem 104 use the calculated frame duration and minislots per frame values to maintain the minislot and frame counters of S-CDMA hardware 114 (Step 408 of FIG. 4) is described next in more detail with reference to FIG. 8.

Figure 8:
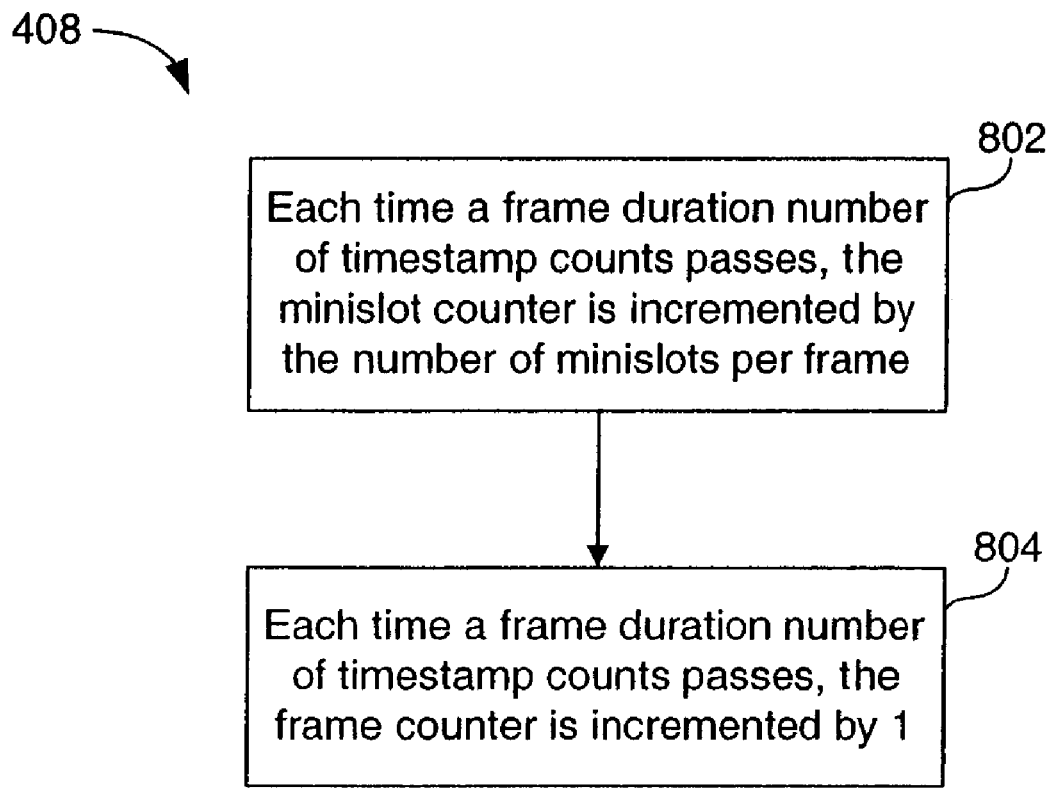
FIG. 8 is a flowchart illustrating how the present invention calculates frame duration and minislots per frame values to maintain the minislot and frame counters of S-CDMA hardware according to an embodiment.

In FIG. 8, control starts at step 802. In step 802, each time a frame duration number of timestamp counts passes, the minislot counter of S-CDMA hardware 114 is incremented by the number of minislots per frame. From the continuing example at 5.12 Msym, each time 425 usec (frame duration) passes, the minislot counter is incremented by 4 (minislots per frame). Control then passes to step 804.

In step 804, each time a frame duration number of timestamp counts passes, the frame counter of S-CDMA hardware 114 is incremented by one. From the continuing example at 5.12 Msym, each time 425 usec (frame duration) passes, the frame counter is incremented by one. The flowchart in FIG. 8 ends at this point. An example environment of the present invention is described next.

F. Example Environment of the Present Invention

Figure 9:
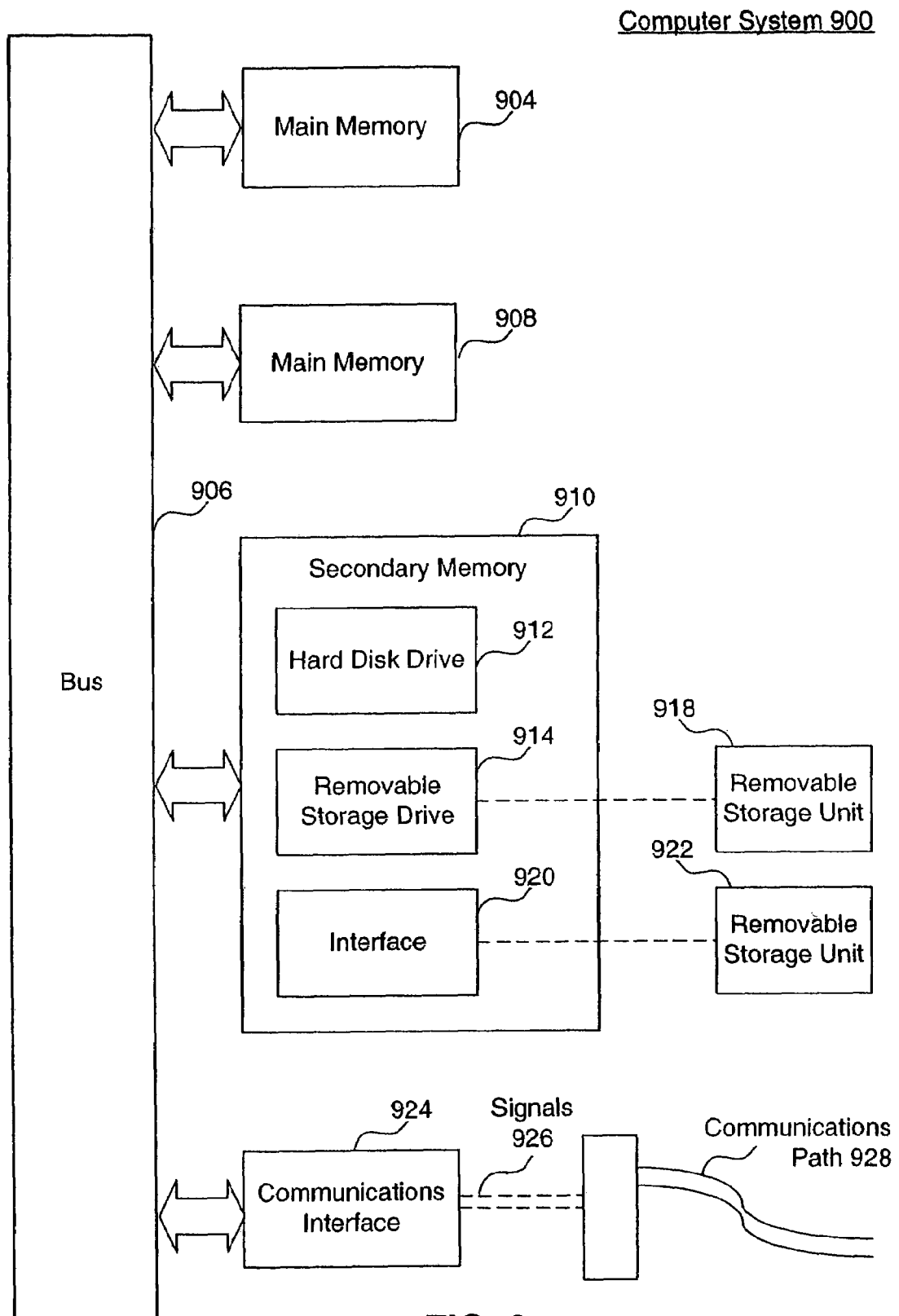
FIG. 9 illustrates an example computer used to implement the CMTS, the CMTS scheduler, and the cable modem scheduler according to an embodiment of the present invention.

CMTS 102, CMTS scheduler 110, and cable modem scheduler 118 may be implemented using computer 900 as shown in FIG. 9. Obviously, more than one of these functional components could be implemented on a single computer 900.

The present invention may be implemented using hardware, software or a combination thereof and may be implemented in a computer system or other processing system. In fact, in one embodiment, the invention is directed towards one or more computer systems capable of carrying out the functionality described herein. The computer system 900 includes one or more processors, such as processor 904. The processor 904 is connected to a communication bus 906.

Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 900.

Computer system 900 can also include a communications interface 924. Communications interface 924 allows software and data to be transferred between computer system 900 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912, and signals 926. These computer program products are means for providing software to computer system 900.

Computer programs (also called computer control logic) are stored in main memory and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

G. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for reusing Synchronous Code Division Multiple Access (S-CDMA) parameters to define Time Division Multiple Access (TDMA) minislot size, comprising the steps of:
   determining S-CDMA parameters to create a S-CDMA-type upstream channel descriptor (UCD) message by a cable modem termination system (CMTS);
   forwarding said S-CDMA-type UCD message to a modem operating in TDMA mode by said CMTS;
   calculating a TDMA minislot size by said modem reusing said S-CDMA parameters;
   calculating a frame duration value and a minislots per frame value;
   using said frame duration value and said minislots per frame value to maintain a minislot counter and a frame counter; and
   constructing a relationship between a system timestamp counter, said minislot counter and said frame counter via a timestamp snapshot.

2. The method of claim 1, wherein said step of calculating said frame duration value and said minislots per frame value, said step of using said frame duration value and said minislots per frame value to maintain said minislot counter and said frame counter, and said step of constructing a relationship between said system timestamp counter, said minislot counter and said frame counter via said timestamp snapshot is performed by both said CMTS and said modem.

3. The method of claim 1, wherein said step of determining S-CDMA parameters comprises the steps of:
   determining a modulation rate parameter;
   determining a spreading intervals per frame (K) parameter;
   determining a number of active codes parameter; and
   determining a codes per minislot (Cms) parameter.

4. The method of claim 3, wherein said minislot size is calculated by multiplying said K parameter by said Cms parameter.

5. The method of claim 3, wherein said frame duration value is calculated by multiplying a duration of spreading interval parameter by said K parameter.

6. The method of claim 3, wherein said minislots per frame value is calculated by dividing said number of active codes parameter by said Cms parameter.

7. The method of claim 1, wherein said step of using said frame duration value and said minislots per frame value to maintain said minislot counter and said frame counter comprises the steps of:
   incrementing said minislot counter by the number of said minislots per frame value each time a frame duration number of timestamp counts passes; and
   incrementing said frame counter by 1 each time said frame duration number of timestamp counts passes.

8. A system for reusing Synchronous Code Division Multiple Access (S-CDMA) parameters to define Time Division Multiple Access (TDMA) minislot size, comprising:
   means for determining S-CDMA parameters to create a S-CDMA-type upstream channel descriptor (UCD) message by a cable modem termination system (CMTS);

means for forwarding said S-CDMA-type UCD message to a modem operating in TDMA mode by said CMTS;

means for calculating a TDMA minislot size by said modem reusing said S-CDMA parameters;

means for calculating a frame duration value and a minislots per frame value;

means for using said frame duration value and said minislots per frame value to maintain a minislot counter and a frame counter; and means for constructing a relationship between a system timestamp counter, said minislot counter and said frame counter via a timestamp snapshot.

9. The system of claim 8, wherein said means for calculating said frame duration value and said minislots per frame value, said means for using said frame duration value and said minislots per frame value to maintain said minislot counter and said frame counter, and said means for constructing a relationship between said system timestamp counter, said minislot counter and said frame counter via said timestamp snapshot is provided by both said CMTS and said modem.

10. The system of claim 8, wherein said means for determining S-CDMA parameters comprises:

means for determining a modulation rate parameter;

means for determining a spreading intervals per frame (K) parameter;

means for determining a number of active codes parameter; and means for determining a codes per minislot (Cms) parameter.

11. The system of claim 10, wherein said minislot size is calculated by multiplying said K parameter by said Cms parameter.

12. The system of claim 10, wherein said frame duration value is calculated by multiplying a duration of spreading interval parameter by said K parameter.

13. The system of claim 10, wherein said minislots per frame value is calculated by dividing said number of active codes parameter by said Cms parameter.

14. The system of claim 8, wherein said means for using said frame duration value and said minislots per frame value to maintain said minislot counter and said frame counter comprises:

means for incrementing said minislot counter by the number of said minislots per frame value each time a frame duration number of timestamp counts passes; and means for incrementing said frame counter by 1 each time said frame duration number of timestamp counts passes.

* * * * *